US012598651B2

(12) United States Patent
Jiang et al.

(10) Patent No.: US 12,598,651 B2
(45) Date of Patent: Apr. 7, 2026

(54) MESSAGE TRANSMISSION METHOD AND APPARATUS, SIGNAL SENDING METHOD AND APPARATUS, AND COMMUNICATION DEVICE

(71) Applicant: VIVO MOBILE COMMUNICATION CO., LTD., Dongguan (CN)

(72) Inventors: Dajie Jiang, Dongguan (CN); Jian Yao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 315 days.

(21) Appl. No.: 18/528,747

(22) Filed: Dec. 4, 2023

(65) Prior Publication Data

US 2024/0121826 A1 Apr. 11, 2024

Related U.S. Application Data

(63) Continuation of application No. PCT/CN2022/096326, filed on May 31, 2022.

(30) Foreign Application Priority Data

Jun. 4, 2021 (CN) .......................... 202110624786.4

(51) Int. Cl.
*H04W 74/0816* (2024.01)
*H04L 27/26* (2006.01)
*H04W 74/08* (2024.01)

(52) U.S. Cl.
CPC ... *H04W 74/0816* (2013.01); *H04L 27/26025* (2021.01); *H04L 27/2605* (2013.01); *H04W 74/0866* (2013.01)

(58) Field of Classification Search
CPC .......... H04W 74/0816; H04W 74/0866; H04L 27/26025; H04L 27/2605; H04L 5/0033;
(Continued)

(56) References Cited

U.S. PATENT DOCUMENTS

2014/0086173 A1\* 3/2014 Sadeghi ................ H04W 72/51
370/328
2017/0141894 A1\* 5/2017 Wei ...................... H04B 17/309
(Continued)

FOREIGN PATENT DOCUMENTS

CN 109451430 A 3/2019
CN 109600843 A \* 4/2019 ............ H04W 72/53
(Continued)

OTHER PUBLICATIONS

International Search Report issued in corresponding International Application No. PCT/CN2022/096326, mailed Aug. 22, 2022, 4 pages.

*Primary Examiner* — Mahendra R Patel
(74) *Attorney, Agent, or Firm* — IPX PLLC

(57) ABSTRACT

A message transmission method, and a communication device are provided. The message transmission method includes: receiving, by a second device, a first message sent by a first device. The first message indicates at least one of the following: a waveform of a first signal requested or suggested by the first device, a sub-carrier spacing of the first signal requested or suggested by the first device, a guard interval of the first signal requested or suggested by the first device, a bandwidth of the first signal requested or suggested by the first device, a duration of the first signal requested or suggested by the first device, a time domain interval of the first signal requested or suggested by the first device, send-ing signal power of the first signal requested or suggested by the first device, or a signal format of the first signal requested or suggested by the first device.

10 Claims, 4 Drawing Sheets

(58) Field of Classification Search
CPC ... H04L 5/0023; H04L 5/0044; H04L 5/0048;
H04L 25/0226; H04L 5/0091; H04L
5/001; H04L 5/0064; H04L 5/0082
USPC ......................................................... 370/329
See application file for complete search history.

(56) References Cited

U.S. PATENT DOCUMENTS

| | | | | |
|---|---|---|---|---|
| 2019/0053271 A1* | 2/2019 | Islam | .................. | H04W 74/002 |
| 2021/0076367 A1* | 3/2021 | Bayesteh | .............. | G01S 7/0234 |
| 2021/0329507 A1* | 10/2021 | Yao | .................. | H04W 36/0085 |

FOREIGN PATENT DOCUMENTS

| | | | | | |
|---|---|---|---|---|---|
| CN | 111757280 A | * | 10/2020 | .............. | H04W 4/12 |
| CN | 109451430 B | * | 9/2021 | ............ | H04W 72/23 |
| CN | 115191094 A | * | 10/2022 | ......... | H04W 68/005 |
| WO | WO-2021047279 A1 | * | 3/2021 | ............ | H04W 72/51 |

* cited by examiner

Start

A third device receives a second message sent by a second device ⟋ 401

The third device sends a first signal based on configuration information of a first signal ⟋ 402

End

Message transmission apparatus

First receiving module ⟋ 501

500

Message transmission apparatus

Second sending module ⟋ 601

600

Signal sending apparatus

Fifth receiving module ⟋ 701

Fifth sending module ⟋ 702

700

MESSAGE TRANSMISSION METHOD AND APPARATUS, SIGNAL SENDING METHOD AND APPARATUS, AND COMMUNICATION DEVICE

CROSS-REFERENCE TO RELATED APPLICATIONS

This application is a continuation of International Application No. PCT/CN2022/096326, filed on May 31, 2022, which claims priority to Chinese Patent Application No. 202110624786.4 filed on Jun. 4, 2021. The entire contents of each of the above-referenced applications are expressly incorporated herein by reference.

TECHNICAL FIELD

This application relates to the field of communication technologies, and in particular, to a message transmission method and apparatus, a signal sending method and apparatus, and a communication device.

BACKGROUND

Future mobile communications systems (for example, a Beyond 5th Generation (B5G) system or a 6th Generation (6G) system) have both communication capabilities and sensing capabilities. One or more devices having sensing capabilities can sense, through sending and receiving of wireless signals, information such as an orientation, a distance and a velocity of a target object, or perform detection, tracking, identification, imaging, or the like on the target object, an event, an environment, or the like. In the future, with deployment of small base stations with large bandwidth capabilities such as millimeter waves and terahertz in a 6G network, sensing resolution is significantly improved compared with millimeter waves, so that the 6G network can provide a more refined perception service.

The purposes of sensing include two main categories. A first category of purpose is sensing for assisting communications or enhancing communication performance, for example, a base station tracks movement of a device to provide a more accurate beamforming alignment device. The other category of purpose is sensing not directly related to communications, for example, a base station monitors a weather situation through a wireless signal, and an electronic device wirelessly senses and identifies a gesture of a user through millimeter waves.

There are several sensing modes as follows:

Active sensing: A device performs sensing by using a reflected signal of a transmitted signal of the device, such as an echo, transceivers are located at a same location, different antennas may be adopted, and surrounding environment information of the device can be sensed.

Passive sensing: Transceivers are located at different locations, and a receiver performs sensing by using a wireless signal transmitted by a sender, for example, a base station A senses environment information between the base station A and a base station B by receiving a wireless signal from the base station B.

Interactive sensing: A sensor and a target object agree on a subject, time, frequency, a format, and the like of electromagnetic wave transmission through information interaction, to complete a sensing process.

Air interface design of the B5G system or 6G system supports both wireless communication signals and wireless sensing signals, and through communications and sensing integrated means such as signal co-design and/or hardware sharing, integrated design of communications and sensing functions (which can be referred to as integrated communications and sensing) is achieved. The B5G system or 6G system can have sensing capabilities or provide sensing services while transferring information. Advantages brought by the integrated communications and sensing include the following aspects: saving costs, reducing a device size; reducing device power consumption; improving spectrum efficiency; and reducing mutual interference between communications and sensing, and improving system performance.

However, in some practical application scenarios, because a terminal and a base station have inconsistent understandings on a format of a sensing signal and the like, or have inconsistent understandings on sensing requirements, it is easy to cause a problem that a sensing signal cannot effectively meet sensing requirements.

SUMMARY

Embodiments of this application provide a message transmission method and apparatus, a signal sending method and apparatus, and a communication device.

According to a first aspect, a message transmission method is provided, including:

A second device receives a first message sent by a first device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal, where the first signal is a signal used for sensing, or the first signal is a sensing and communication integrated signal.

According to a second aspect, a message transmission method is provided, including:

A first device sends a first message to a second device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal, where the first signal is a signal used for sensing, or the first signal is a sensing and communication integrated signal.

According to a third aspect, a signal sending method is provided, including:

A third device receives a second message sent by a second device, the second message indicating configuration information of a first signal; and the third device sends the first signal based on the configuration information of the first signal, where the first signal is a signal used for sensing, or the first signal is a sensing and communication integrated signal.

According to a fourth aspect, a message transmission apparatus is provided, applied to a second device. The apparatus includes:

a first receiving module, configured to receive a first message sent by a first device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal, where the first signal is a signal used for sensing, or the first signal is a sensing and communication integrated signal.

According to a fifth aspect, a message transmission apparatus is provided, applied to a first device. The apparatus includes:

a second sending module, configured to send a first message to a second device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal, where the first signal is a signal used for sensing, or the first signal is a sensing and communication integrated signal.

According to a sixth aspect, a signal sending apparatus is provided, applied to a third device. The apparatus includes:

a fifth receiving module, configured to receive a second message sent by the second device, the second message indicating configuration information of a first signal; and a fifth sending module, configured to send the first signal based on the configuration information of the first signal, where the first signal is a signal used for sensing, or the first signal is a sensing and communication integrated signal.

According to a seventh aspect, a communication device is provided. A terminal includes a processor, a memory, and a program or instructions stored in the memory and runnable on the processor, where when the program or instructions are executed by the processor, steps of the method according to the first aspect are implemented, or when the program or instructions are executed by the processor, steps of the method according to the second aspect are implemented, or when the program or instructions are executed by the processor, steps of the method according to the third aspect are implemented.

According to an eighth aspect, a communication device is provided, and includes a processor and a communication interface. The communication interface is configured to receive a first message sent by a first device; or the communication interface is configured to send a first message to a second device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal, where the first signal is a signal used for sensing, or the first signal is a sensing and communication integrated signal;

or the communication interface is configured to receive a second message sent by a second device, the second message indicating configuration information of a first signal. The processor is configured to send, through the communication interface, the first signal based on the configuration information of the first signal. The first signal is a signal used for sensing, or the first signal is a sensing and communication integrated signal.

According to a ninth aspect, a readable storage medium is provided. The readable storage medium stores a program or instructions. When the program or instructions are executed by a processor, steps of the method according to the first aspect are implemented, or steps of the method according to the second aspect are implemented, or steps of the method according to the third aspect are implemented.

According to a tenth aspect, a chip is provided. The chip includes a processor and a communication interface. The communication interface is coupled to the processor. The processor is configured to run a program or instructions to implement the method according to the first aspect, or to implement the method according to the second aspect, or to implement the method according to the third aspect.

According to an eleventh aspect, a computer program/program product is provided. The computer program/program product is stored in a storage medium. When the computer program/program product is executed by at least one processor, steps of the method according to the first aspect are implemented, or steps of the method according to the second aspect are implemented, or steps of the method according to the third aspect are implemented.

In the embodiments of this application, a first device having a sensing requirement requests, through a first message, a first signal to a second device based on the sensing requirement of the first device, and the second device can control sending of the first signal based on the first message, can perform centralized resource allocation, and can control possible interferences of the first signal on other signals, so that the first signal can better meet the sensing requirement.

DETAILED DESCRIPTION

The technical solutions in embodiments of this application are clearly described in the following with reference to the accompanying drawings in the embodiments of this application. Apparently, the described embodiments are merely some rather than all of the embodiments of this application. All other embodiments obtained by a person skilled in the art based on the embodiments of this application fall within the scope of protection of this application.

In the specification and claims of this application, terms such as "first" and "second" are used to distinguish similar objects, and are not used to describe a specific sequence or order. It is to be understood that such terms can be interchanged as appropriate, so that the embodiments of this application can be implemented in an order different from the order shown or described herein. Moreover, objects distinguished by "first" and "second" generally belong to one type, and a quantity of objects is not limited. For example, there may be one or more first objects. In addition, "and/or" used in the specification and claims represents at least one of the connected objects. The character "/" generally represents an "or" relationship between associated objects.

It is worth noting that the technologies described in the embodiments of this application are not limited to a Long Term Evolution (LTE)/LTE-Advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. In the embodiments of this application, terms "system" and "network" generally can be interchanged as appropriate. The technology described herein can be applied to the systems and radio technologies mentioned above, and can also be applied to other systems and radio technologies. The description below describes a New Radio (NR) system for purposes of example, and NR terminology is used in much of the description below, but the technologies can also be applied to applications other than NR system applications, such as a 6G communications system.

Figures 1, 2, 3:
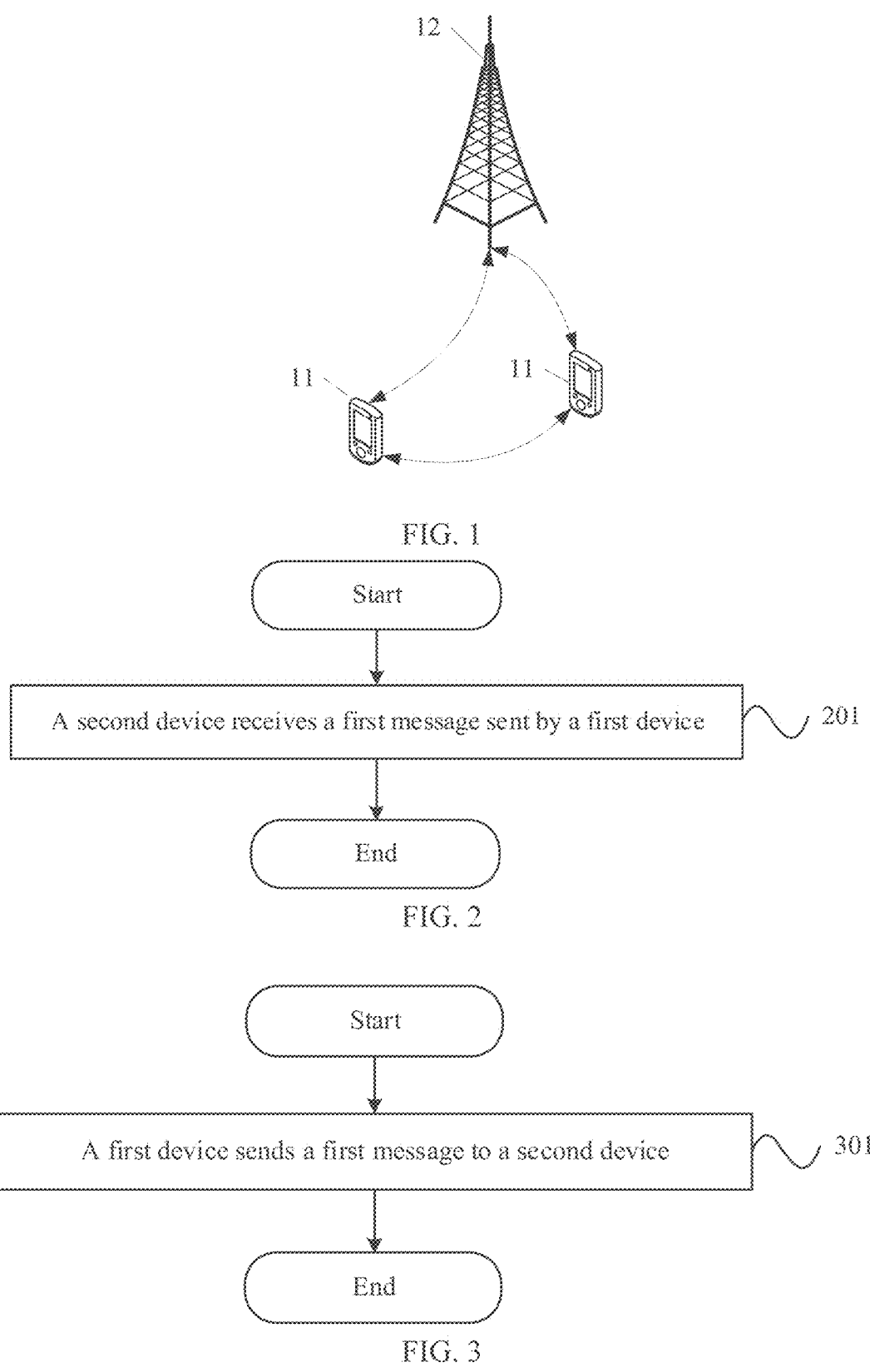
FIG. 1 is a block diagram of a wireless communications system according to an embodiment of this application.
FIG. 2 is a first flowchart of steps of a message transmission method according to an embodiment of this application.
FIG. 3 is a second flowchart of steps of a message transmission method according to an embodiment of this application.

FIG. 1 is a block diagram of a wireless communications system in which an embodiment of this application is used. The wireless communications system includes a terminal 11 and a network-side device 12. The terminal 11 may also be referred to as a terminal device or a User Equipment (UE). The terminal 11 may be a terminal-side device, such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device or Vehicle User Equipment (VUE), or Pedestrian User Equipment (PUE). The wearable device includes, a smart watch, a wrist band, earphones, glasses, or the like. It should be noted that the specific type of the terminal 11 is not limited in the embodiments of this application. The network-side device 12 may be a base station or a core network. The base station may be referred to as a Node B, an evolved Node B, an access point, a Base Transceiver Station (BTS), a radio base station, a radio transceiver, a Basic Service Set (BSS), an Extended Service Set (ESS), a Node B, an evolved Node B (eNB), a home Node B, a home evolved Node B, a WLAN access point, a WiFi node, a Transmission and Reception Point (TRP), or another appropriate term in the art. Provided that a same technical effect is achieved, the base station is not limited to a specific technical term. It should be noted that in the embodiments of this application, only a base station in an NR system is used as an example, but a specific type of the base station is not limited.

The following describes the message transmission method and apparatus, the signal sending method and apparatus, and the communication device provided in embodiments of this application by using some embodiments and application scenarios thereof with reference to the accompanying drawings.

Application scenarios involved in the embodiments of this application include at least the following.

Scenario 1: A terminal device sends a millimeter wave sensing signal and then receives an echo of the sensing signal, for detecting a gesture of a user, or for purposes such as scanning an outline of an object in a black box. Signal formats under different sensing purposes or sensing requirements are different A terminal clearly knows the sensing purpose, and also knows the format of a sensing signal corresponding to the sensing purpose. However, a millimeter wave band used for sensing is a licensed band, and requires unified management of a base station, to avoid mutual interference between a sensing signal and a communication signal, or between sensing signals.

Scenario 2: A terminal expects that a base station sends a specific sensing signal, and the terminal receives the signal, for detecting a weather situation, building conditions, or pedestrian flow conditions, or the like between the base station and the terminal. Signal formats under different sensing purposes or sensing requirements are different. However, the base station needs to determine what format of sensing signal to send can meet the sensing requirement of the terminal.

As illustrated in FIG. 2, an embodiment of this application provides a message transmission method, including:

Step 201: A second device receives a first message sent by a first device, the first message indicating at least one of the following:

a waveform of a first signal requested or suggested by the first device, for example: one or more of signals such as Orthogonal Frequency Division Multiplexing (OFDM), SC-FDMA, Orthogonal Time Frequency Space (OTFS), Frequency Modulated Continuous Wave (FMCW), and pulse signals;

a sub-carrier spacing of the first signal requested or suggested by the first device, for example, a minimum sub-carrier spacing, or a maximum sub-carrier spacing, or a sub-carrier spacing range;

a guard interval of the first signal requested or suggested by the first device, for example, a maximum guard spacing, or a minimum guard spacing, or a guard spacing range; a time interval between the signal end sending time and the receiving time of a latest echo signal of the signal;

a bandwidth of the first signal requested or suggested by the first device, for example, a maximum bandwidth, or a minimum bandwidth, or a bandwidth range;

a duration of the first signal requested or suggested by the first device, this parameter being a time span of the first signal, for example, a minimum duration, or a maximum duration, or a duration range;

a time domain interval of the first signal requested or suggested by the first device, this parameter being a time interval between two adjacent first signals, for example, a maximum time domain interval, or a minimum time domain interval, or a time interval range;

sending signal power of the first signal requested or suggested by the first device, for example, a value taken every 2 dBm from −20 dBm to 23 dBm;

a signal format of the first signal requested or suggested by the first device, for example, information such as a Sounding Reference Signal (SRS), a Demodulation Reference Signal (DMRS), a Positioning Reference Signal (PRS), or other predefined signals, and related sequence formats;

a signal direction of the first signal requested or suggested by the first device, for example, a shift angle in a direction of the first signal by taking a line connecting a first device to a second device as a reference angle (for example, for controlling a possible interference of the first signal on a neighboring cell);

a time resource of the first signal requested or suggested by the first device, for example, a slot index where the first signal is located or a symbol index of a slot, where there are two types of time resources, one is a disposable time resource, for example, an omnidirectional first signal is sent by one symbol; the other one is a non-disposable time resource, such as a plurality of groups of periodic time resources or discontinuous time resources (which can include start time and end time); the first signal in a same direction is sent by each group of periodic time resources, and the beam directions on different groups of periodic time resources are different;

a frequency domain resource of the first signal requested or suggested by the first device, including a center frequency point of the first signal, a bandwidth, a Resource Block (RB) or a sub-carrier, and the like; and information of processing time when the first device receives an echo of the first signal. For example, the first signal is a pulse signal, and certain processing time for detecting an echo of the first signal by the first device is required. The first device cannot receive other signals within the processing time, therefore, this needs to be reported to a second device to prevent the second device from scheduling other signals within the processing time (this parameter is also referred to as a device capability of the first device).

For example, the first message indicates that the first signal is an OFDM signal, has a sub-carrier spacing of 60 KHz, and has a Cyclic Prefix (CP) of a normal CP. For another example, the first message indicates that the first signal is an OTFS signal, has M and N in two-dimensional Fourier transform of respectively 16 and 1024, and has a sub-carrier spacing of 30 KHz.

In some embodiments, the first message indicates requesting or suggesting sending the first signal. For example, the first device requests or suggests the second device to send the first signal by sending the first message or the first device sends the first signal.

In the embodiment of this application, the first device is a device having a sensing requirement, and may be a base station, a terminal, a device to device link (sidelink) device, a perception server, or the like. The second device is a control device of the first signal, and a computing unit of a similar Location Management Function (LMF), and may be a base station, a terminal, a device to device link (sidelink) device, a perception server, or the like, which are not specifically limited herein.

In the embodiment of this application, the first device is a device having a sensing requirement, and may be a base station, a terminal, a device to device link (sidelink) device, a perception server, or the like. The second device is a control device of the first signal, and a computing unit of a similar LMF, and may be a base station, a terminal, a device to device link (sidelink) device, a perception server, or the like, which are not specifically limited herein.

The first signal is a signal used for sensing, for example, sensing information such as an orientation, a distance, and a velocity of a target object, or performing detection, tracking, identification, imaging, or the like on the target object, an event, an environment, or the like; or the first signal is a sensing and communication integrated signal, or an integrated sensing and communication signal.

As an embodiment, in a case that the first device is a terminal and the second device is a base station, the first message may be sent through a Physical Uplink Control Channel (PUCCH), or a Physical Uplink Shared Channel (PUSCH), or MSG1 or MSG3 of 4-step random access, or MSG A of 2-step random access.

As an embodiment of this application, the method further includes:

The second device determines configuration information of the first signal based on the first message.

As another embodiment of this application, the method further includes:

The second device sends a second message to the first device and/or a third device, the second message indicating configuration information of the first signal, so that the first device or the third device sends the first signal based on the configuration information of the first signal.

In the embodiment of this application, the third device may be a first signal sending device, or may be a first signal receiving device. The third device may be a base station, a terminal, a sidelink device, a perception server, or the like, which is not specifically limited herein.

It should be noted that the first message mentioned in the embodiment of this application may also indicate sending the first signal by the first device, or sending the first signal by the third device. The second device sends, to a corresponding device, the configuration information of the first signal based on the indication of the first message.

The configuration information of the first signal indicates at least one of the following:

a waveform of the first signal configured by the second device, for example, the second device determines, based on the indication content of the first message, which one of signals such as OFDM, SC-FDMA, OTFS, FMCW, and pulse signals the first signal is;

a sub-carrier spacing of the first signal configured by the second device, for example, a minimum sub-carrier spacing, or a maximum sub-carrier spacing, or a sub-carrier spacing range;

a guard interval of the first signal configured by the second device, for example, a maximum guard spacing, or a minimum guard spacing, or a guard spacing range; a time interval between the signal end sending time and the receiving time of a latest echo signal of the signal;

a bandwidth of the first signal configured by the second device, for example, a maximum bandwidth, or a minimum bandwidth, or a bandwidth range;

a duration of the first signal configured by the second device, this parameter being a time span of the first signal, for example, a minimum duration, or a maximum duration, or a duration range;

a time domain interval of the first signal configured by the second device, this parameter being a time interval between two adjacent first signals, for example, a maximum time domain interval, or a minimum time domain interval, or a time interval range;

sending signal power of the first signal configured by the second device, for example, a value taken every 2 dBm from −20 dBm to 23 dBm;

a signal format of the first signal configured by the second device, for example, information such as a Sounding Reference Signal (SRS), a Demodulation Reference Signal (DMRS), a Positioning Reference Signal (PRS), or other predefined signals, and related sequence formats;

a signal direction of the first signal configured by the second device, for example, a shift angle in a direction of the first signal by taking a line connecting a first device to a second device as a reference angle (for example, for controlling a possible interference of the first signal on a neighboring cell);

a time domain resource of the first signal configured by the second device, for example, a slot index where the first signal is located or a symbol index of a slot, where there are two types of time resources, one is a disposable time resource, for example, an omnidirectional first signal is sent by one symbol; the other one is a non-disposable time resource, such as a plurality of groups of periodic time resources or discontinuous time resources (which can include start time and end time); the first signal in a same direction is sent by each group of periodic time resources, and the beam directions on different groups of periodic time resources are different; and a frequency domain resource of the first signal configured by the second device, including a center frequency point of the first signal, a bandwidth, a RB or a sub-carrier, and the like.

In some embodiments, the configuration information of the first signal indicates a measurement quantity of the first signal related to sensing. The measurement quantity related to sensing includes at least one of the following:

a channel matrix;

channel state information;

power of each path in a multi-path channel;

a delay of each path in the multi-path channel;

an angle of each path in the multi-path channel;

information of a reflection point;

target radar cross-section area information;

Doppler spread;

Doppler frequency shift;

a phase difference between antennas; and a delay difference between the antennas.

The measurement quantity includes a measurement quantity based on each antenna, and/or a measurement quantity based on each sensing resource. The angle of each path in the multi-path channel includes an angle of arrival and/or an angle of departure.

In at least one embodiment of this application, the second message may be sent through at least one of layer 1 signaling, a Media Access Control Control Element (MAC CE), Radio Resource Control (RRC) signaling, System Information Block (SIB) signaling, and Master Information Block (MIB).

As at least one embodiment of this application, in a case that the second device cannot obtain, based on the indication of the first message, the configuration information meeting the sensing requirement, the second device may reject the sensing requirement of the first device and notifies the first device of a rejection message.

In at least one embodiment of this application, the first message may directly carry the specific content indicated by the first message, such as a waveform, a sub-carrier spacing, and a guard interval of the first signal;

or the first message includes: a first index number, the first index number being associated with content indicated by the first message. In other words, all or some of items indicated by the first message may be jointly encoded; therefore, the first message only needs to carry a first index number, the first index number being associated with content indicated by the first message.

In at least one embodiment of this application, the second message includes:

the configuration information of the first signal;

or a second index number, the second index number being associated with the configuration information of the first signal. In other words, all or some of items indicated by the configuration information of the first signal may be jointly encoded; therefore, the second message only needs to carry a second index number, the second index number being associated with the configuration information of the first signal. Details are shown in Table 1:

TABLE 1

| Index number | Configuration information of first signal |
|---|---|
| Index 1 | OFDM signal, having a sub-carrier spacing of 60 KHz, and a CP of a normal CP, or the like |
| Index 2 | OFDM signal, having a sub-carrier spacing of 60 KHz, and a CP of an extended CP, or the like |
| Index 3 | OTFS signal, having M and N in two-dimensional Fourier transform of respectively 16 and 1024, and a sub-carrier spacing of 30 KHz |
| . . . | . . . |

Furthermore, after the second device sends the configuration information of the first signal to the first device and/or a third device, the method further includes:

The first device detects the first signal or an echo of the first signal, and obtains a measurement quantity related to sensing. The measurement quantity related to sensing includes at least one of the following:

a channel matrix;
channel state information;
power of each path in a multi-path channel;
a delay of each path in the multi-path channel;
an angle of each path in the multi-path channel;
information of a reflection point;

target radar cross-section area information;
Doppler spread;
Doppler frequency shift;
a phase difference between antennas; and
a delay difference between the antennas.

The measurement amount includes: a measurement quantity based on each antenna, and/or a measurement quantity based on each sensing resource.

Furthermore, the method further includes:

The first device determines, based on the measurement quantity related to sensing, sensing result information related to a sensing requirement of the first device.

In some alternative embodiments, the first device sends the measurement quantity related to sensing to a fourth device, so that the fourth device determines, based on the measurement quantity related to sensing, sensing result information related to a sensing requirement of the first device, and sends the sensing result information related to the sensing requirement of the first device to the first device.

It should be noted that the fourth device is a receiving/processing device of feedback information of the first signal, and a computing unit of a similar LMF, and may be a base station, a terminal, a device to device link (sidelink) device, a perception server, or the like, which are not specifically limited herein. Furthermore, it should be noted that the fourth device may be an independently arranged device, or may be a unit attached to another device. For example, a fourth device is configured on a first device, or is configured on a second device, or is configured on a third device, which is not specifically limited herein.

For example, the sensing result information related to the sensing requirement of the first device includes at least one of the following: information such as an orientation, a distance, and a velocity of a target object, or results such as performing detection, tracking, identification, and imaging on the target object, an event, an environment, or the like.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

As illustrated in FIG. 3, an embodiment of this application further provides a message transmission method, including:

Step 301: A first device sends a first message to a second device, the first message indicating at least one of the following:

a waveform of a first signal requested or suggested by the first device, for example: one or more of signals such as OFDM, SC-FDMA, OTFS, FMCW, and pulse signals;

a sub-carrier spacing of the first signal requested or suggested by the first device, for example, a minimum sub-carrier spacing, or a maximum sub-carrier spacing, or a sub-carrier spacing range;

a guard interval of the first signal requested or suggested by the first device, for example, a maximum guard spacing, or a minimum guard spacing, or a guard spacing range; a time interval between the signal end sending time and the receiving time of a latest echo signal of the signal;

a bandwidth of the first signal requested or suggested by the first device, for example, a maximum bandwidth, or a minimum bandwidth, or a bandwidth range;

a duration of the first signal requested or suggested by the first device, this parameter being a time span of the first signal, for example, a minimum duration, or a maximum duration, or a duration range;

a time domain interval of the first signal requested or suggested by the first device, this parameter being a time interval between two adjacent first signals, for example, a maximum time domain interval, or a minimum time domain interval, or a time interval range;

sending signal power of the first signal requested or suggested by the first device, for example, a value taken every 2 dBm from −20 dBm to 23 dBm;

a signal format of the first signal requested or suggested by the first device, for example, information such as a SRS, a DMRS, a PRS, or other predefined signals, and related sequence formats;

a signal direction of the first signal requested or suggested by the first device, for example, a shift angle in a direction of the first signal by taking a line connecting a first device to a second device as a reference angle (for example, for controlling a possible interference of the first signal on a neighboring cell);

a time resource of the first signal requested or suggested by the first device, for example, a slot index where the first signal is located or a symbol index of a slot, where there are two types of time resources, one is a disposable time resource, for example, an omnidirectional first signal is sent by one symbol, the other one is a non-disposable time resource, such as a plurality of groups of periodic time resources or discontinuous time resources (which can include start time and end time); the first signal in a same direction is sent by each group of periodic time resources; and the beam directions on different groups of periodic time resources are different;

a frequency domain resource of the first signal requested or suggested by the first device, including a center frequency point of the first signal, a bandwidth, a RB or a sub-carrier, and the like; and information of processing time when the first device receives an echo of the first signal. For example, the first signal is a pulse signal, and certain processing time for detecting an echo of the first signal by the first device is required. The first device cannot receive other signals within the processing time; therefore, this needs to be reported to a second device to prevent the second device from scheduling other signals within the processing time (this parameter is also referred to as a device capability of the first device).

For example, the first message indicates that the first signal is an OFDM signal, has a sub-carrier spacing of 60 KHz, and has a CP of a normal CP, or the like. For another example, the first message indicates that the first signal is an OTFS signal, has M and N in two-dimensional Fourier transform of respectively 16 and 1024, and has a sub-carrier spacing of 30 KHz.

In the embodiment of this application, the first device is a device having a sensing requirement, and may be a base station, a terminal, a device to device link (sidelink) device, a perception server, or the like. The second device is a control device of the first signal, and a computing unit of a similar LMF, and may be a base station, a terminal, a device to device link (sidelink) device, a perception server, or the like, which are not specifically limited herein.

In the embodiment of this application, the first device is a device having a sensing requirement, and may be a base station, a terminal, a device to device link (sidelink) device, a perception server, or the like. The second device is a control device of the first signal, and a computing unit of a similar LMF, and may be a base station, a terminal, a device to device link (sidelink) device, a perception server, or the like, which are not specifically limited herein.

The first signal is a signal used for sensing, for example, sensing information such as an orientation, a distance, and a velocity of a target object, or performing detection, tracking, identification, imaging, or the like on the target object, an event, an environment, or the like, or the first signal is a sensing and communication integrated signal, or an integrated sensing and communication signal.

As an embodiment, the first message may be sent through a PUCCH, or a PUSCH, or MSG1 or MSG3 of 4-step random access, or MSG A of 2-step random access.

As an embodiment of this application, the method further includes:

The first device receives a second message sent by the second device, the second message indicating configuration information of the first signal; and the first device sends the first signal based on the configuration information of the first signal.

In some alternative embodiments, the method further includes:

The first device receives a first signal sent by a third device based on configuration information of the first signal, where the configuration information of the first signal is sent by the second device to the third device by using a second message.

In the embodiment of this application, the third device may be a first signal sending device, or may be a first signal receiving device. The third device may be a base station, a terminal, a sidelink device, a perception server, or the like, which is not specifically limited herein.

It should be noted that the first message mentioned in the embodiment of this application may also indicate sending the first signal by the first device, or sending the first signal by the third device. The second device sends, to a corresponding device, the configuration information of the first signal based on the indication of the first message.

The configuration information of the first signal indicates at least one of the following:

a waveform of the first signal configured by the second device, for example, the second device determines, based on the indication content of the first message, which one of signals such as OFDM, SC-FDMA, OTFS, FMCW, and pulse signals the first signal is;

a sub-carrier spacing of the first signal configured by the second device, for example, a minimum sub-carrier spacing, or a maximum sub-carrier spacing, or a sub-carrier spacing range;

a guard interval of the first signal configured by the second device, for example, a maximum guard spacing, or a minimum guard spacing, or a guard spacing range, a time interval between the signal end sending time and the receiving time of a latest echo signal of the signal;

a bandwidth of the first signal configured by the second device, for example, a maximum bandwidth, or a minimum bandwidth, or a bandwidth range;

a duration of the first signal configured by the second device, this parameter being a time span of the first signal, for example, a minimum duration, or a maximum duration, or a duration range;

a time domain interval of the first signal configured by the second device, this parameter being a time interval between two adjacent first signals, for example, a maximum time domain interval, or a minimum time domain interval, or a time interval range;

sending signal power of the first signal configured by the second device, for example, a value taken every 2 dBm from −20 dBm to 23 dBm;

a signal format of the first signal configured by the second device, for example, information such as a SRS, a DMRS, a PRS, or other predefined signals, and related sequence formats;

a signal direction of the first signal configured by the second device, for example, a shift angle in a direction of the first signal by taking a line connecting a first device to a second device as a reference angle (for example, for controlling a possible interference of the first signal on a neighboring cell);

a time domain resource of the first signal configured by the second device, for example, a slot index where the first signal is located or a symbol index of a slot, where there are two types of time resources, one is a disposable time resource, for example, an omnidirectional first signal is sent by one symbol; the other one is a non-disposable time resource, such as a plurality of groups of periodic time resources or discontinuous time resources (which can include start time and end time); the first signal in a same direction is sent by each group of periodic time resources; and the beam directions on different groups of periodic time resources are different;

a frequency domain resource of the first signal configured by the second device, including a center frequency point of the first signal, a bandwidth, a RB or a sub-carrier, and the like.

In at least one embodiment of this application, the second message may be sent through at least one of layer 1 signaling, a MAC CE, RRC signaling, SIB signaling, and MIB.

In at least one embodiment of this application, the first message may directly carry the specific content indicated by the first message, such as a waveform, a sub-carrier spacing, and a guard interval of the first signal;

or the first message includes a first index number, the first index number being associated with content indicated by the first message. In other words, all or some of items indicated by the first message may be jointly encoded; therefore, the first message only needs to carry a first index number, the first index number being associated with content indicated by the first message.

In at least one embodiment of this application, the second message includes:

the configuration information of the first signal;

or a second index number, the second index number being associated with the configuration information of the first signal. In other words, all or some of items indicated by the configuration information of the first signal may be jointly encoded; therefore, the second message only needs to carry a second index number, the second index number being associated with the configuration information of the first signal.

In at least one embodiment of this application, the method further includes:

The first device detects the first signal or an echo of the first signal, and obtains a measurement quantity related to sensing. The measurement quantity related to sensing includes at least one of the following:

a channel matrix;

channel state information;

power of each path in a multi-path channel;

a delay of each path in the multi-path channel;

an angle of each path in the multi-path channel;

information of a reflection point;

target radar cross-section area information;

Doppler spread;

Doppler frequency shift;

a phase difference between antennas; and a delay difference between the antennas.

The measurement amount includes: a measurement quantity based on each antenna, and/or a measurement quantity based on each sensing resource.

Furthermore, the method further includes:

The first device determines, based on the measurement quantity related to sensing, sensing result information related to sensing requirements of the first device.

In some alternative embodiments, the method further includes:

The first device sends the measurement quantity related to sensing to a fourth device, so that the fourth device determines, based on the measurement quantity related to sensing, sensing result information related to a sensing requirement of the first device; and the first device receives the sensing result information related to the sensing requirement of the first device and sent by the fourth device.

It should be noted that the fourth device is a receiving/ processing device of feedback information of the first signal, and a computing unit of a similar LMF, and may be a base station, a terminal, a device to device link (sidelink) device, a perception server, or the like, which are not specifically limited herein. Furthermore, it should be rioted that the fourth device may be an independently arranged device, or may be a unit attached to another device. For example, a fourth device is configured on a first device, or is configured on a second device, or is configured on a third device, which is not specifically limited herein.

For example, the sensing result information related to the sensing requirement of the first device includes at least one of the following: information such as an orientation, a distance, and a velocity of a target object, or results such as performing detection, tracking, identification, and imaging on the target object, an event, an environment, or the like.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

Figures 4, 5, 6, 7:
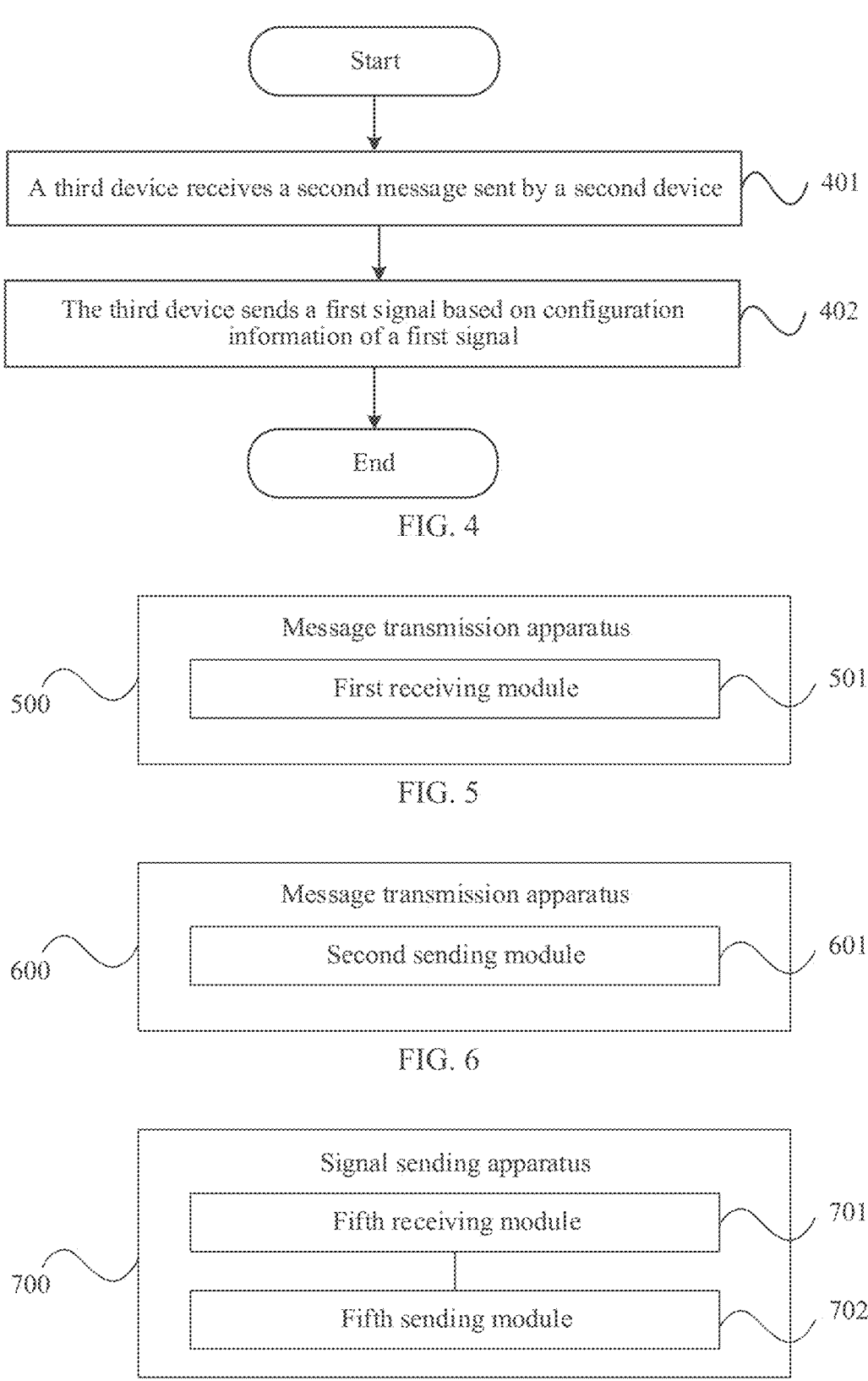
FIG. 4 is a flowchart of steps of a signal sending method according to an embodiment of this application.
FIG. 5 is a first schematic diagram of a structure of a message transmission apparatus according to an embodiment of this application.
FIG. 6 is a second schematic diagram of a structure of a message transmission apparatus according to an embodiment of this application.
FIG. 7 is a schematic diagram of a structure of a signal sending apparatus according to an embodiment of this application.

As illustrated in FIG. 4, an embodiment of this application further provides a signal sending method, including:

Step 401: A third device receives a second message sent by a second device, the second message indicating configuration information of a first signal; and Step 402: The third device sends the first signal based on the configuration information of the first signal, where the first signal is a signal used for sensing, or the first signal is a sensing and communication integrated signal.

It should be noted that the second message is sent after the second device receives the first message sent by the first device, and the first message indicates at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal.

In the embodiment of this application, the first device is a device having a sensing requirement, and may be a base station, a terminal, a device to device link (sidelink) device, a perception server, or the like. The second device is a control device of the first signal, and a computing unit of a similar LMF, and may be a base station, a terminal, a device to device link (sidelink) device, a perception server, or the like, which are not specifically limited herein.

It should be noted that the second device may be an independently arranged device, or may be a unit attached to another device. For example, a second device is configured on a first device, or is configured on a third device, which is not specifically limited herein.

In at least one embodiment of this application, the configuration information of the first signal indicates at least one of the following:

a waveform of the first signal configured by the second device, for example, the second device determines, based on the indication content of the first message, which one of signals such as OFDM, SC-FDMA, OTFS, FMCW, and pulse signals the first signal is;

a sub-carrier spacing of the first signal configured by the second device, for example, a minimum sub-carrier spacing, or a maximum sub-carrier spacing, or a sub-carrier spacing range;

a guard interval of the first signal configured by the second device, for example, a maximum guard spacing, or a minimum guard spacing, or a guard spacing range; a time interval between the signal end sending time and the receiving time of a latest echo signal of the signal;

a bandwidth of the first signal configured by the second device, for example, a maximum bandwidth, or a minimum bandwidth, or a bandwidth range;

a duration of the first signal configured by the second device, this parameter being a time span of the first signal, for example, a minimum duration, or a maximum duration, or a duration range;

a time domain interval of the first signal configured by the second device, this parameter being a time interval between two adjacent first signals, for example, a maximum time domain interval, or a minimum time domain interval, or a time interval range;

sending signal power of the first signal configured by the second device, for example, a value taken every 2 dBm from −20 dBm to 23 dBm;

a signal format of the first signal configured by the second device, for example, SRS, DMRS, PRS, and the like, or information such as other predefined signals, and related sequence formats;

a signal direction of the first signal configured by the second device, for example, a shift angle in a direction of the first signal by taking a line connecting a first device to a second device as a reference angle (for example, for controlling a possible interference of the first signal on a neighboring cell);

a time domain resource of the first signal configured by the second device, for example, a slot index where the first signal is located or a symbol index of a slot, where there are two types of time resources, one is a disposable time resource, for example, an omnidirectional first signal is sent by one symbol, the other one is a non-disposable time resource, such as a plurality of groups of periodic time resources or discontinuous time resources (which can include start time and end time); the first signal in a same direction is sent by each group of periodic time resources; and the beam directions on different groups of periodic time resources are different; and a frequency domain resource of the first signal configured by the second device, including a center frequency point of the first signal, a bandwidth, a RB or a sub-carrier, and the like.

In at least one embodiment of this application, the second message includes:

the configuration information of the first signal;

or a second index number, the second index number being associated with the configuration information of the first signal. In other words, all or some of items indicated by the configuration information of the first signal may be jointly encoded; therefore, the second message only needs to carry a second index number, the second index number being associated with the configuration information of the first signal.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

It should be noted that an execution main body of the method provided in the embodiment of this application may be an apparatus, or a control module in the apparatus for executing the method. The following describes the apparatus provided in the embodiment of this application by taking the apparatus executing the method as an example.

As illustrated in FIG. 5, an embodiment of this application further provides a message transmission apparatus 500, applied to a second device and including:

a first receiving module 501, configured to receive a first message sent by a first device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal.

The first signal is a signal used for sensing, or the first signal is a sensing and communication integrated signal.

As an embodiment, the apparatus further includes:

a first determining module, configured to determine configuration information of the first signal based on the first message.

As an embodiment, the apparatus further includes:

a first sending module, configured to send a second message to the first device and/or a third device, the second message indicating configuration information of the first signal, so that the first device or the third device sends the first signal based on the configuration information of the first signal.

As an embodiment, the configuration information of the first signal indicates at least one of the following:

a waveform of the first signal configured by the second device;

a sub-carrier spacing of the first signal configured by the second device;

a guard interval of the first signal configured by the second device;

a bandwidth of the first signal configured by the second device;

a duration of the first signal configured by the second device;

a time domain interval of the first signal configured by the second device, sending signal power of the first signal configured by the second device;

a signal format of the first signal configured by the second device;

a signal direction of the first signal configured by the second device;

a time domain resource of the first signal configured by the second device; and a frequency domain resource of the first signal configured by the second device.

As an embodiment, the first message includes:

a first index number, the first index number being associated with content indicated by the first message.

As an embodiment, the second message includes:

the configuration information of the first signal;

or a second index number, the second index number being associated with the configuration information of the first signal.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

It should be noted that the message transmission apparatus provided in the embodiment of this application is an apparatus capable of executing the message transmission method, therefore, all embodiments of the message transmission method are applicable to the apparatus, and can achieve the same or similar effects.

As illustrated in FIG. 6, an embodiment of this application further provides a message transmission apparatus 600, applied to a first device and including:

a second sending module 601, configured to send a first message to a second device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device, a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal.

The first signal is a signal used for sensing, or the first signal is a sensing and communication integrated signal.

As an embodiment, the apparatus further includes:

a second receiving module, configured to receive a second message sent by the second device, the second message indicating configuration information of the first signal; and a third sending module, configured to send the first signal based on the configuration information of the first signal.

As an embodiment, the apparatus further includes:

a third receiving module, configured to receive, by the first device, a second message sent by the second device, the second message indicating configuration information of the first signal; and send, by the first device, the first signal based on the configuration information of the first signal.

As an embodiment, the configuration information of the first signal indicates at least one of the following:

a waveform of the first signal configured by the second device;

a sub-carrier spacing of the first signal configured by the second device;

a guard interval of the first signal configured by the second device;

a bandwidth of the first signal configured by the second device;

a duration of the first signal configured by the second device;

a time domain interval of the first signal configured by the second device;

sending signal power of the first signal configured by the second device;

a signal format of the first signal configured by the second device;

a signal direction of the first signal configured by the second device;

a time domain resource of the first signal configured by the second device; and a frequency domain resource of the first signal configured by the second device.

As an embodiment, the first message includes:

a first index number, the first index number being associated with content indicated by the first message.

As an embodiment, the second message includes:

the configuration information of the first signal;

or a second index number, the second index number being associated with the configuration information of the first signal.

As an embodiment, the apparatus further includes:

an obtaining module, configured to detect the first signal or an echo of the first signal, and obtain a measurement quantity related to sensing. The measurement quantity related to sensing includes at least one of the following:

a channel matrix;

channel state information;

power of each path in a multi-path channel;

a delay of each path in the multi-path channel;

an angle of each path in the multi-path channel;

information of a reflection point;

target radar cross-section area information;

Doppler spread;

Doppler shift;

a phase difference between antennas; and a delay difference between the antennas.

As an embodiment, the measurement quantity includes: a measurement quantity based on each antenna, and/or a measurement quantity based on each sensing resource.

As an embodiment, the apparatus further includes:

a second determining module, configured to determine, based on the measurement quantity related to sensing, sensing result information related to a sensing requirement of the first device.

As an embodiment, the apparatus further includes:

a fourth sending module, configured to send the measurement quantity related to sensing to a fourth device, so that the fourth device determines, based on the measurement quantity related to sensing, sensing result information related to a sensing requirement of the first device; and a fourth receiving module, configured to receive the sensing result information related to the sensing requirement of the first device and sent by the fourth device.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

It should be noted that the message transmission apparatus provided in the embodiment of this application is an apparatus capable of executing the message transmission method; therefore, all embodiments of the message transmission method are applicable to the apparatus, and can achieve the same or similar effects.

As illustrated in FIG. 7, the present disclosure provides a signal sending apparatus 700, applied to a third device and including:

a fifth receiving module 701, configured to receive a second message sent by a second device, the second message indicating configuration information of a first signal; and a fifth sending module 702, configured to send the first signal based on the configuration information of the first signal, where the first signal is a signal used for sensing, or the first signal is a sensing and communication integrated signal.

As an embodiment, the configuration information of the first signal indicates at least one of the following:

a waveform of the first signal configured by the second device;

a sub-carrier spacing of the first signal configured by the second device;

a guard interval of the first signal configured by the second device;

a bandwidth of the first signal configured by the second device;

a duration of the first signal configured by the second device;

a time domain interval of the first signal configured by the second device;

sending signal power of the first signal configured by the second device;

a signal format of the first signal configured by the second device;

a signal direction of the first signal configured by the second device;

a time domain resource of the first signal configured by the second device; and a frequency domain resource of the first signal configured by the second device.

As an embodiment, the second message includes:

the configuration information of the first signal;

or a second index number, the second index number being associated with the configuration information of the first signal.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

It should be noted that the signal sending apparatus provided in the embodiment of this application is an apparatus capable of executing the signal sending method; therefore, all embodiments of the signal sending method are applicable to the apparatus, and can achieve the same or similar effects.

The message transmission apparatus or the signal sending apparatus in the embodiment of this application may be an apparatus, an apparatus having an operating system or an electronic device, or a component in a terminal, an integrated circuit, or a chip. The apparatus or the electronic device may be a mobile terminal, or may be a non-mobile terminal. Exemplarily, the mobile terminal includes, but is not limited to the type of the terminal 11 listed above, and the non-mobile terminal is a server, a Network Attached Storage (NAS), a Personal Computer (PC), a Television (TV), a teller machine or a self-service machine, and the like, which is not specifically limited in the embodiment of this application.

The message transmission apparatus or the signal sending apparatus provided in the embodiment of this application can implement the processes implemented by method embodiments in FIG. 1 to FIG. 4, and can achieve the same technical effects. To avoid repetition, no detailed description is provided herein.

Figure 8:
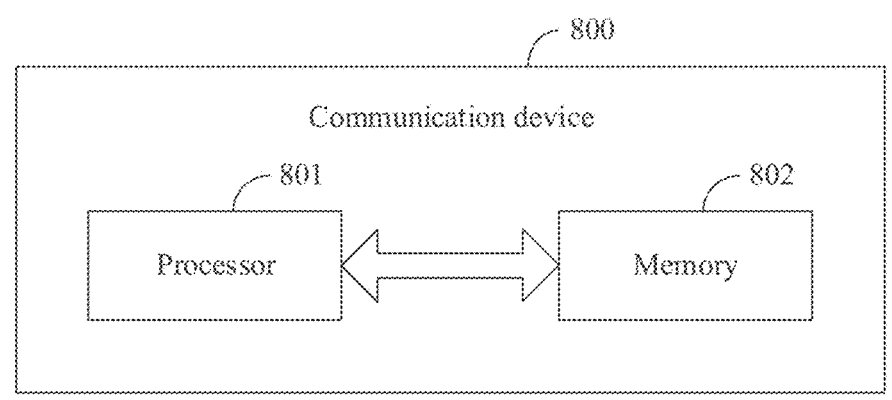
FIG. 8 is a schematic diagram of a structure of a communication device according to an embodiment of this application.

For example, as illustrated in FIG. 8, an embodiment of this application further provides a communication device 800, including a processor 801, a memory 802, and a program or instructions stored on the memory 802 and runnable on the processor 801, where the program or instructions, when executed by the processor 801, implement the processes of the method embodiments, and can achieve the same technical effects. To avoid repetition, no detailed description is provided herein.

The embodiment of this application further provides a communication device, including a processor and a communication interface. The communication interface is configured to receive a first message sent by a first device; or the communication interface is configured to send a first message to a second device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal.

The first signal is a signal used for sensing, or the first signal is a sensing and communication integrated signal;

or the communication interface is configured to receive a second message sent by a second device, the second message indicating configuration information of a first signal. The processor is configured to send, through the communication interface, the first signal based on the configuration information of the first signal. The first

Figure 9:
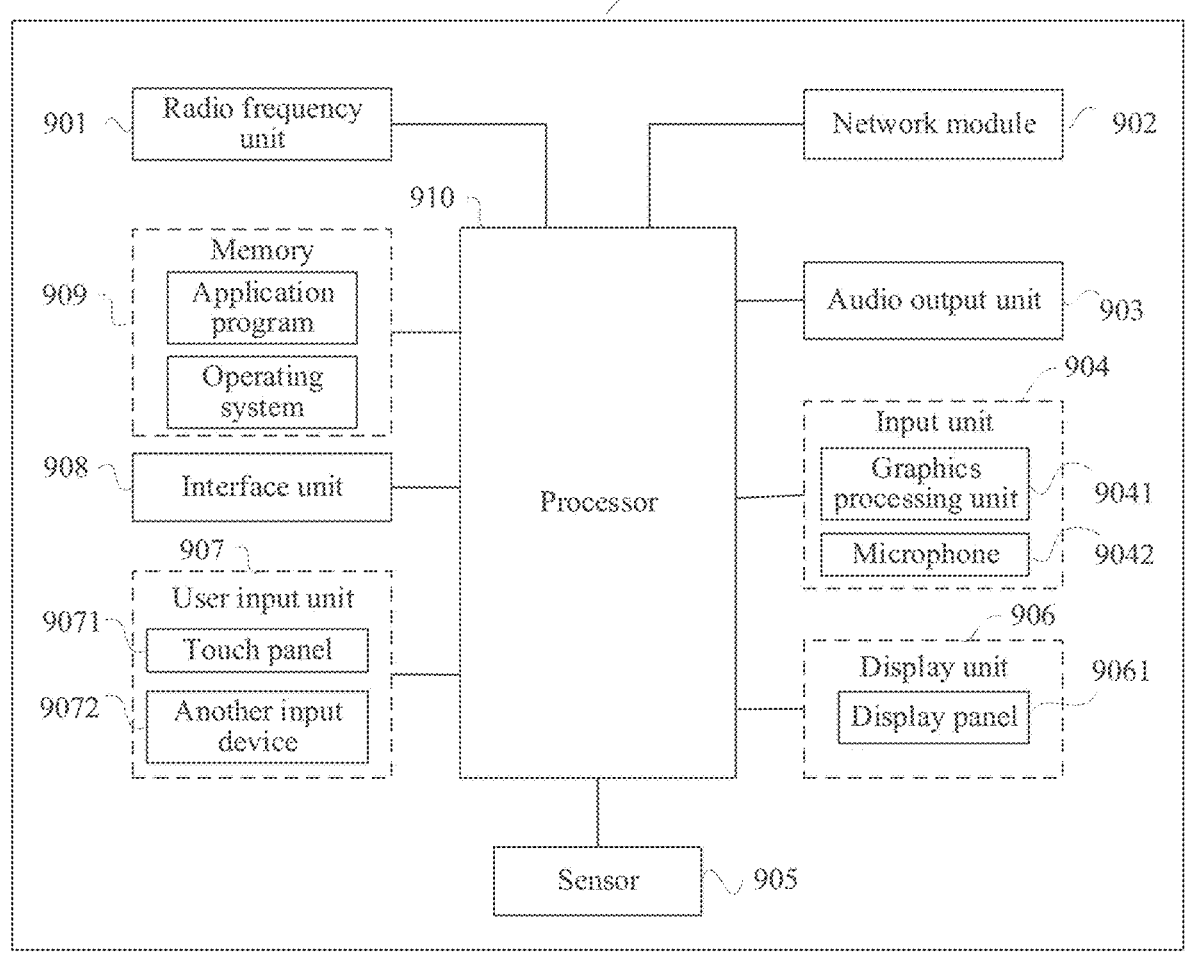
FIG. 9 is a schematic diagram of a structure of a terminal according to an embodiment of this application.

24 signal is a signal used for sensing, or the first signal is a sensing and communication integrated signal. The terminal embodiment corresponds to the terminal-side method embodiment. The implementation processes and implementation modes of the method embodiments are all applicable to the terminal embodiment, and can achieve the same technical effects. In a case that the communication device is a terminal, for example, FIG. 9 is a schematic diagram of a structure of hardware of a terminal according to an embodiment of this application.

The terminal 900 includes, but is not limited to, at least some components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include power supplies (such as a battery) for supplying power to the components. The power supply may be logically connected to the processor 910 through a power management system, thereby implementing functions such as charging, discharging, and power consumption management through the power management system. The structure of the terminal shown in FIG. 9 does not constitute a limitation on the terminal, and the terminal may include more or fewer components than shown, or combine some components, or have different component arrangements. No detailed description is provided herein.

In the embodiment of this application, it is to be understood that the input unit 904 may include a Graphics Processing Unit (GPU) 9041 and a microphone 9042. The graphics processing unit 9041 performs processing on image data of a static picture or a video that is obtained by an image capture apparatus (for example, a camera) in a video capture mode or an image capture mode. The display unit 906 may include a display panel 9061. The display panel 9061 may be configured in the form of a liquid crystal display, an organic light-emitting diode, or the like. The user input unit 907 includes a touch panel 9071 and another input device 9072. The touch panel 9071 is also referred to as a touch screen. The touch panel 9071 may include two parts: a touch detection apparatus and a touch controller. The another input device 9072 may include, but is not limited to, a physical keyboard, a functional key (such as a volume control key or a switch key), a trackball, a mouse, and a joystick, which are not described herein in detail.

In the embodiment of this application, after receiving downlink data from a network-side device, the radio frequency unit 901 sends the downlink data to the processor 910 for processing; and the radio frequency unit 901 sends uplink data to the network-side device. Generally, the radio frequency unit 901 includes, but is not limited to, an antenna, at least one amplifier, a transceiver, a coupler, a low noise amplifier, a duplexer, and the like.

The memory 909 is configured to store a software program or instructions and various data. The memory 109 may mainly include a program or instruction storage area and a data storage area. The program or instruction storage area may store an operating system, an application program or instructions required by at least one function (for example, a sound playback function and an image display function), and the like. In addition, the memory 909 may include a high-speed random access memory, or a non-volatile memory. The non-volatile memory may be a Read-Only Memory (ROM), a Programmable ROM (PROM), an Erasable PROM (EPROM), an Electrically EPROM (EEPROM) or a flash memory, for example, at least one magnetic disk storage device, a flash memory device, or another non-volatile solid-state storage device.

The processor 910 may include one or more processing units. In some embodiments, the processor 910 may integrate an application processor and a modem processor, where the application processor mainly processes an operating system, a user interface, an application program or instructions, and the like, and the modem processor mainly processes wireless communication, and is, for example, a baseband processor. It is to be understood that the modem processor may not be integrated into the processor 910.

The radio frequency unit 901 is configured to receive a first message sent by a first device; or is configured to send a first message to a second device, the first message indicating at least one of the following:

a waveform of a first signal requested or suggested by the first device;

a sub-carrier spacing of the first signal requested or suggested by the first device;

a guard interval of the first signal requested or suggested by the first device;

a bandwidth of the first signal requested or suggested by the first device;

a duration of the first signal requested or suggested by the first device;

a time domain interval of the first signal requested or suggested by the first device;

sending signal power of the first signal requested or suggested by the first device;

a signal format of the first signal requested or suggested by the first device;

a signal direction of the first signal requested or suggested by the first device;

a time resource of the first signal requested or suggested by the first device;

a frequency domain resource of the first signal requested or suggested by the first device; and information of processing time when the first device receives an echo of the first signal, where the first signal is a signal used for sensing, or the first signal is a sensing and communication integrated signal;

or the radio frequency 901 is configured to receive a second message sent by a second device, the second message indicating configuration information of a first signal; and send the first signal based on the configuration information of the first signal, where the first signal is a signal used for sensing, or the first signal is a sensing and communication integrated signal.

In the embodiment of this application, a first device having a sensing requirement determines, based on the sensing requirement of the first device, requirement information of the first signal, and requests, through a first message, the first signal to a second device, and the second device can control sending of the first signal based on the first message, can perform centralized resource allocation, and can control possible interferences of the first signal on other signals.

Figure 10:
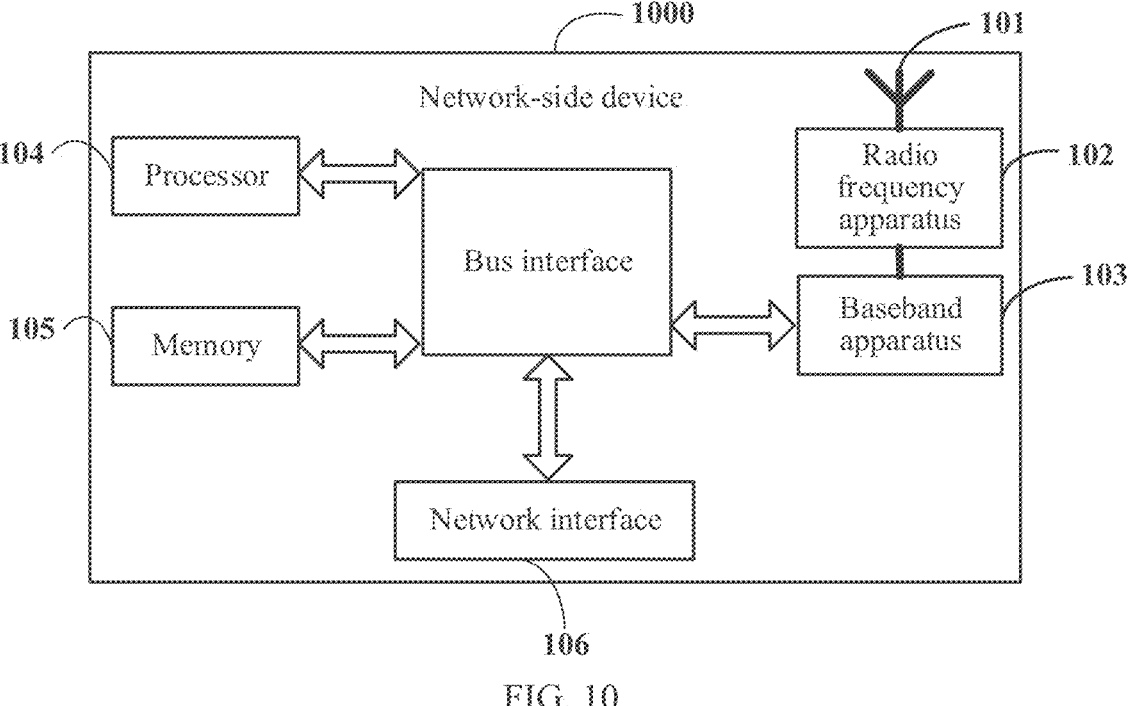
FIG. 10 is a schematic diagram of a structure of a network-side device according to an embodiment of this application.

In a case that the communication device is a network-side device, as illustrated in FIG. 10, the network-side device 1000 includes: an antenna 101, a radio frequency apparatus 102, and a baseband apparatus 103. The antenna 101 is connected to the radio frequency apparatus 102. In an uplink direction, the radio frequency apparatus 102 receives information through the antenna 101, and sends the received information to the baseband apparatus 103 for processing. In a downlink direction, the baseband apparatus 103 processes information to be sent, and sends same to the radio frequency apparatus 102, and the radio frequency apparatus 102 processes the received information, and then sends same through the antenna 101.

The frequency band processing apparatus may be located in the baseband apparatus 103. The method executed by the network-side device in the embodiments above may be implemented in the baseband apparatus 103. The baseband apparatus 103 includes a processor 104 and a memory 105.

The baseband apparatus 103 may include, for example, at least one baseband board. The baseband board is provided with a plurality of chips. As illustrated in FIG. 10, one of the chips is, for example, a processor 104, and is connected to the memory 105 to call a program in the memory 105 for implementing the operations of the network device shown in the method embodiments.

The baseband apparatus 103 may further include a network interface 106, which is configured to interact information with the radio frequency apparatus 102. The interface is, for example, a Common Public Radio Interface (CPRI).

For example, the network-side device in the embodiment of the present disclosure further includes: an instruction or program stored on the memory 105 and runnable on the processor 104. The processor 104 calls the instruction or program in the memory 105 to execute the method executed by the modules shown in FIG. 10, and achieves the same technical effects. To avoid repetition, no detailed description is provided herein.

The embodiment of this application further provides a readable storage medium, storing a program or instructions, where the program or instructions, when executed by a processor, implement the processes of the message transmission method or signal sending method embodiments, and can achieve the same technical effects. To avoid repetition, no detailed description is provided herein.

The processor is a processor in the terminal in the foregoing embodiments. The readable storage medium includes a computer readable storage medium, for example, a computer ROM, a Random Access Memory, RAM, a magnetic disk, or an optical disc.

The embodiment of this application further provides a chip. The chip includes a processor and a communication interface. The communication interface is coupled to the processor. The processor is configured to run a program or instructions to implement the processes of the message transmission method or signal sending method embodiments, and can achieve the same technical effects. To avoid repetition, no detailed description is provided herein.

It is to be understood that the chip provided in the embodiment of this application may also be referred to as a system on a chip, a system chip, a chip system, or a system chip on a chip, and the like.

The embodiment of this application further provides a computer program/program product. The computer program/program product is stored in a storage medium. The program/program product is implemented by at least one processor to implement the processes of the embodiment of the method shown in FIG. 2, or FIG. 3, or FIG. 4, and can achieve the same technical effects. To avoid repetition, no detailed description is provided herein.

It should be noted that the terms "including", "comprising" or any other variants thereof in this application are intended to cover non-exclusive inclusion, so that a process, method, article or apparatus including a series of elements not only includes those elements, but also includes other elements that are not explicitly listed, or elements inherent to the process, method, article or apparatus Without more limitations, the element defined by the sentence "including a . . . " does not exclude the existence of other identical elements in the process, method, article or apparatus including the element. In addition, it needs to be pointed out that in ranges of the method and apparatus in the embodiments of this application, functions are not limited to be executed based on the shown or discussed sequence, including executing functions based on a basically simultaneous manner or an opposite sequence in accordance with involved functions. For example, the described method is executed based on a sequence different from the described sequence, and steps may be added, omitted or combined. In addition, features described with reference to some examples may be combined in other examples.

Based on the descriptions of the embodiments, a person skilled in the art can clearly understand that the method in the embodiment can be implemented by means of software plus a necessary general hardware platform, or by means of software. In some embodiments, the technical solutions in this application essentially, or a part contributing to the prior art may be implemented in a form of a computer software product. The computer software product is stored in a storage medium (such as a ROM/RAM, a floppy disk, and an optical disk), and includes a plurality of instructions for instructing one terminal (which may be a mobile phone, a computer, a server, an air conditioner, or a network device, or the like) to execute the method in embodiments of this application.

The embodiments of this application have been described above with reference to the accompanying drawings. However, this application is not limited to the specific embodiments described above, and the specific embodiments described above are merely exemplary and not limitative. A person skilled in the art may make various variations under the teaching of this application without departing from the spirit of this application and the scope of protection of the claims, and such variations shall all fall within the scope of protection of this application.

What is claimed is:

1. A message transmission method, comprising:
receiving, by a second device, a first message sent by a first device, wherein the first message comprises: a first index number, and the first index number is associated with content indicated by the first message, wherein the first message comprises at least one of the following:
a duration of the first signal requested or suggested by the first device;
sending signal power of the first signal requested or suggested by the first device;
a signal direction of the first signal requested or suggested by the first device; or
information of processing time when the first device receives an echo of the first signal, wherein the first signal is a signal used for sensing, or the first signal is a sensing and communication integrated signal;
determining, by the second device, configuration information of the first signal based on the first message; and
sending, by the second device, a second message to the first device or a third device, wherein the second message indicates the configuration information of the first signal, so that the first device or the third device sends the first signal based on the configuration information of the first signal,
wherein the second message comprises:
the configuration information of the first signal, or a second index number associated with the configuration information of the first signal.

2. The message transmission method according to claim 1, wherein the configuration information of the first signal indicates at least one of the following:
a waveform of the first signal configured by the second device;
a sub-carrier spacing of the first signal configured by the second device;
a guard interval of the first signal configured by the second device;
a bandwidth of the first signal configured by the second device;
a duration of the first signal configured by the second device;
a time domain interval of the first signal configured by the second device;
sending signal power of the first signal configured by the second device;
a signal format of the first signal configured by the second device;
a signal direction of the first signal configured by the second device;
a time domain resource of the first signal configured by the second device; or
a frequency domain resource of the first signal configured by the second device.

3. A message transmission method, comprising:
sending, by a first device, a first message to a second device, wherein the first message comprises: a first index number, and the first index number is associated with content indicated by the first message, wherein the first message comprises at least one of the following:
a duration of the first signal requested or suggested by the first device;
sending signal power of the first signal requested or suggested by the first device;
a signal direction of the first signal requested or suggested by the first device;
or
information of processing time when the first device receives an echo of the first signal, wherein the first signal is a signal used for sensing, or the first signal is a sensing and communication integrated signal;
receiving, by the first device, a second message sent by the second device, wherein the second message indicates configuration information of the first signal; and
sending, by the first device, the first signal based on the configuration information of the first signal; and
receiving, by the first device, the first signal sent by a third device based on configuration information of the first signal, wherein the configuration information of the first signal is sent by the second device to the third device by using the second message,
wherein the second message comprises:
the configuration information of the first signal, or
a second index number associated with the configuration information of the first signal.

4. The message transmission method according to claim 3, wherein the configuration information of the first signal indicates at least one of the following:
a waveform of the first signal configured by the second device;
a sub-carrier spacing of the first signal configured by the second device;
a guard interval of the first signal configured by the second device;

a bandwidth of the first signal configured by the second device;

a duration of the first signal configured by the second device;

a time domain interval of the first signal configured by the second device;

sending signal power of the first signal configured by the second device;

a signal format of the first signal configured by the second device;

a signal direction of the first signal configured by the second device;

a time domain resource of the first signal configured by the second device; or a frequency domain resource of the first signal configured by the second device.

5. The message transmission method according to claim 3, further comprising:

detecting, by the first device, the first signal or an echo of the first signal, and obtaining a measurement quantity related to sensing, wherein the measurement quantity related to sensing comprises at least one of the following:

a channel matrix;

channel state information;

power of each path in a multi-path channel;

a delay of each path in the multi-path channel;

an angle of each path in the multi-path channel;

information of a reflection point;

target radar cross-section area information;

Doppler spread;

Doppler frequency shift;

a phase difference between antennas; or a delay difference between the antennas.

6. The message transmission method according to claim 5, wherein the measurement quantity comprises: a measurement quantity based on each antenna, or a measurement quantity based on each sensing resource.

7. The message transmission method according to claim 5, further comprising:

determining, by the first device, based on the measurement quantity related to sensing, sensing result information related to a sensing requirement of the first device.

8. The message transmission method according to claim 5, further comprising:

sending, by the first device, the measurement quantity related to sensing to a fourth device, so that the fourth device determines, based on the measurement quantity related to sensing, sensing result information related to a sensing requirement of the first device; and receiving, by the first device, the sensing result information related to the sensing requirement of the first device and sent by the fourth device.

9. A communication device, comprising a processor; and a memory having a computer program or an instruction stored thereon, wherein the computer program or the instruction, when executed by the processor, causes the processor to perform operations comprising:

receiving, by a second device, a first message sent by a first device, wherein the first message comprises: a first index number, and the first index number is associated with content indicated by the first message, wherein the first message comprises at least one of the following:

a duration of the first signal requested or suggested by the first device;

sending signal power of the first signal requested or suggested by the first device;

a signal direction of the first signal requested or suggested by the first device;

or information of processing time when the first device receives an echo of the first signal, wherein the first signal is a signal used for sensing, or the first signal is a sensing and communication integrated signal;

determining, by the second device, configuration information of the first signal based on the first message; and sending, by the second device, a second message to the first device or a third device, wherein the second message indicates the configuration information of the first signal, so that the first device or the third device sends the first signal based on the configuration information of the first signal, wherein the second message comprises:

the configuration information of the first signal, or a second index number associated with the configuration information of the first signal.

10. The communication device according to claim 9, wherein the configuration information of the first signal indicates at least one of the following:

a waveform of the first signal configured by the second device;

a sub-carrier spacing of the first signal configured by the second device;

a guard interval of the first signal configured by the second device;

a bandwidth of the first signal configured by the second device;

a duration of the first signal configured by the second device;

a time domain interval of the first signal configured by the second device;

sending signal power of the first signal configured by the second device;

a signal format of the first signal configured by the second device;

a signal direction of the first signal configured by the second device;

a time domain resource of the first signal configured by the second device; or a frequency domain resource of the first signal configured by the second.

* * * * *